United States Patent
Fincham et al.

(10) Patent No.: US 12,352,068 B2
(45) Date of Patent: *Jul. 8, 2025

(54) WAVE POOL AND WAVE GENERATOR FOR BI-DIRECTIONAL AND DYNAMICALLY-SHAPED SURFING WAVES

(71) Applicant: Kelly Slater Wave Company, LLC, Los Angeles, CA (US)

(72) Inventors: Adam Fincham, Los Angeles, CA (US); Alex Poirot, Los Angeles, CA (US); Nathan Loewen, Coldstream, CA (US); Robert Kelly Slater, Los Angeles, CA (US)

(73) Assignee: Kelly Slater Wave Company, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,452

(22) Filed: Nov. 9, 2023

(65) Prior Publication Data
US 2024/0151053 A1    May 9, 2024

Related U.S. Application Data

(63) Continuation of application No. 17/697,847, filed on Mar. 17, 2022, now Pat. No. 11,851,906, which is a
(Continued)

(51) Int. Cl.
*E04H 4/00* (2006.01)
*A63B 69/00* (2006.01)
*F04D 35/00* (2006.01)

(52) U.S. Cl.
CPC ....... *E04H 4/0006* (2013.01); *A63B 69/0093* (2013.01); *F04D 35/00* (2013.01); *A63B 2208/03* (2013.01)

(58) Field of Classification Search
CPC .............. E04H 4/0006; A63B 69/0093; A63B 2208/03; F04D 35/00
See application file for complete search history.

(56) References Cited

U.S. PATENT DOCUMENTS

| 2,994,201 A | 8/1961 | Hutchings |
| 3,008,673 A | 11/1961 | Caddell |

(Continued)

FOREIGN PATENT DOCUMENTS

| AU | 558270 B2 | 1/1987 |
| AU | 4889499 A | 2/2000 |

(Continued)

OTHER PUBLICATIONS

Boussinesq M.J., "Théorie de l'intumescence liquide, appelée onde solitaire ou de translation, se propageant dans un canal rectangulaire," C.-R. Acad. Sci. Paris, 72(1871), p. 755-59.).

(Continued)

*Primary Examiner* — Janie M Loeppke

(57) ABSTRACT

A wave pool and wave generating mechanism are disclosed. The wave pool includes a bathymetry that includes a dynamically shapeable reef along a length or circumference of a channel that defines the wave pool. The wave generating mechanism includes a foil that has a shape for bi-directionality based on an adjustment of a yaw angle of the foil. The foil can be further controlled to increase or decrease certain surface areas or other angles of interacting with water in the wave pool.

21 Claims, 13 Drawing Sheets

Related U.S. Application Data continuation of application No. 16/786,787, filed on Feb. 10, 2020, now Pat. No. 11,280,100, which is a continuation of application No. 15/691,175, filed on Aug. 30, 2017, now Pat. No. 10,597,884.

(56) References Cited

U.S. PATENT DOCUMENTS

| | | |
|---|---|---|
| 3,530,211 A | 9/1970 | Uhlig |
| 3,802,697 A | 4/1974 | Le Mehaute |
| 3,913,332 A | 10/1975 | Forsman |
| 4,062,192 A | 12/1977 | Biewer |
| 4,078,605 A | 3/1978 | Jones |
| 4,783,860 A | 11/1988 | Funke et al. |
| 4,792,260 A | 12/1988 | Sauerbier |
| 4,812,077 A | 3/1989 | Raike |
| 4,954,014 A | 9/1990 | Sauerbier et al. |
| 5,171,101 A | 12/1992 | Sauerbier et al. |
| 5,207,531 A | 5/1993 | Ross |
| 5,213,547 A | 5/1993 | Lochtefeld |
| 5,236,280 A | 8/1993 | Lochtefeld |
| 5,271,692 A | 12/1993 | Lochtefeld |
| 5,393,170 A | 2/1995 | Lochtefeld |
| 5,401,117 A | 3/1995 | Lochtefeld |
| 5,421,782 A | 6/1995 | Lochtefeld |
| 5,503,597 A | 4/1996 | Lochtefeld et al. |
| 5,564,859 A | 10/1996 | Lochtefeld |
| 5,628,584 A | 5/1997 | Lochtefeld |
| 5,664,910 A | 9/1997 | Lochtefeld et al. |
| 5,667,445 A | 9/1997 | Lochtefeld |
| 5,738,590 A | 4/1998 | Lochtefeld |
| 5,766,082 A | 6/1998 | Lochtefeld et al. |
| 5,860,766 A | 1/1999 | Lochtefeld et al. |
| 5,899,633 A | 5/1999 | Lochtefeld |
| 5,899,634 A | 5/1999 | Lochtefeld |
| 5,911,190 A | 6/1999 | Lochtefeld et al. |
| 6,105,527 A | 8/2000 | Lochtefeld et al. |
| 6,132,317 A | 10/2000 | Lochtefeld |
| 6,241,422 B1 | 6/2001 | Makowski |
| 6,319,137 B1 | 11/2001 | Lochtefeld |
| 6,336,771 B1 * | 1/2002 | Hill ............... A63G 31/007 4/491 |
| 6,460,201 B1 | 10/2002 | Lochtefeld |
| 6,491,589 B1 | 12/2002 | Lochtefeld |
| 6,608,563 B2 | 8/2003 | Weston et al. |
| 6,676,530 B2 | 1/2004 | Lochtefeld |
| 6,716,107 B2 | 4/2004 | Lochtefeld |
| 6,738,992 B2 | 5/2004 | Lochtefeld |
| 6,758,231 B1 | 7/2004 | Lochtefeld et al. |
| 6,928,670 B2 | 8/2005 | Lochtefeld et al. |
| 6,957,662 B2 | 10/2005 | Lochtefeld et al. |
| 7,004,093 B2 | 2/2006 | Loui et al. |
| 7,040,994 B2 | 5/2006 | Lochtefeld et al. |
| RE39,171 E | 7/2006 | Lochtefeld |
| 7,401,786 B2 | 7/2008 | Lochtefeld |
| 7,513,504 B2 | 4/2009 | Lochtefeld |
| 7,547,255 B2 | 6/2009 | Lochtefeld |
| 7,666,104 B2 | 2/2010 | Lochtefeld |
| 7,951,011 B2 | 5/2011 | Lochtefeld |
| 8,096,891 B2 | 1/2012 | Lochtefeld et al. |
| 8,262,316 B2 | 9/2012 | Slater et al. |
| 8,496,403 B2 | 7/2013 | Lochtefeld et al. |
| 8,550,926 B2 | 10/2013 | Lochtefeld |
| 8,561,221 B2 | 10/2013 | Lochtefeld et al. |
| 8,573,887 B2 | 11/2013 | Slater et al. |
| 8,641,543 B2 | 2/2014 | Lochtefeld |
| 8,882,604 B2 | 11/2014 | Lochtefeld |
| 9,144,727 B2 | 9/2015 | Lochtefeld |
| 9,476,213 B2 | 10/2016 | Slater et al. |
| 9,506,259 B2 | 11/2016 | Lochtefeld et al. |
| 9,546,491 B2 | 1/2017 | Slater et al. |
| 9,550,127 B2 | 1/2017 | Lochtefeld |
| 9,556,633 B2 | 1/2017 | Lochtefeld et al. |
| 9,574,360 B2 | 2/2017 | Fincham et al. |
| 9,777,494 B2 | 10/2017 | Lochtefeld et al. |
| 9,856,665 B2 | 1/2018 | Lochtefeld et al. |
| 9,879,438 B2 | 1/2018 | Lochtefeld et al. |
| 10,105,611 B2 | 10/2018 | Lochtefeld |
| 10,233,660 B2 | 3/2019 | Lochtefeld et al. |
| 10,458,136 B2 | 10/2019 | Lochtefeld et al. |
| 11,040,289 B2 | 6/2021 | Lochtefeld |
| 11,572,702 B2 | 2/2023 | Lochtefeld |
| 2002/0008622 A1 | 1/2002 | Weston et al. |
| 2002/0056157 A1 | 5/2002 | Lochtefeld |
| 2002/0072422 A1 | 6/2002 | Lochtefeld |
| 2002/0180155 A1 | 12/2002 | Lochtefeld |
| 2003/0004003 A1 | 1/2003 | Lochtefeld |
| 2003/0009821 A1 | 1/2003 | Lochtefeld |
| 2003/0119592 A1 | 6/2003 | Lochtefeld et al. |
| 2003/0180095 A1 | 9/2003 | McFarland |
| 2003/0198515 A1 | 10/2003 | McFarland |
| 2005/0034768 A1 | 2/2005 | Lochtefeld et al. |
| 2005/0047869 A1 | 3/2005 | Lochtefeld |
| 2005/0148398 A1 | 7/2005 | Lochtefeld |
| 2005/0178310 A1 | 8/2005 | Loui et al. |
| 2005/0274420 A1 | 12/2005 | Lochtefeld et al. |
| 2005/0286976 A1 | 12/2005 | Lochtefeld et al. |
| 2006/0260697 A1 | 11/2006 | Lochtefeld et al. |
| 2007/0090602 A1 | 4/2007 | Lochtefeld |
| 2008/0021776 A1 | 1/2008 | Lochtefeld |
| 2008/0085159 A1 | 4/2008 | McFarland et al. |
| 2008/0089744 A1 | 4/2008 | McFarland |
| 2008/0216427 A1 | 9/2008 | Lochtefeld |
| 2009/0169305 A1 | 7/2009 | Lochtefeld |
| 2009/0176588 A1 | 7/2009 | Lochtefeld |
| 2009/0191785 A1 | 7/2009 | Lochtefeld |
| 2009/0260146 A1 | 10/2009 | Webber |
| 2010/0000014 A1 | 1/2010 | Lochtefeld et al. |
| 2010/0017951 A1 | 1/2010 | Odriozola Sagastume |
| 2010/0124459 A1 | 5/2010 | Slater et al. |
| 2010/0124460 A1 | 5/2010 | Fricano |
| 2010/0125943 A1 | 5/2010 | Lochtefeld et al. |
| 2011/0237337 A1 | 9/2011 | Lochtefeld |
| 2013/0061382 A1 | 3/2013 | Fincham et al. |
| 2013/0130815 A1 | 5/2013 | Lochtefeld |
| 2013/0199433 A1 | 8/2013 | Lochtefeld |
| 2014/0059758 A1 | 3/2014 | Slater et al. |
| 2014/0105685 A1 | 4/2014 | McFarland |
| 2014/0133914 A1 | 5/2014 | Lochtefeld et al. |
| 2014/0189948 A1 | 7/2014 | Lochtefeld et al. |
| 2014/0250579 A1 | 9/2014 | Slater et al. |
| 2014/0304905 A1 | 10/2014 | Bennett et al. |
| 2015/0033465 A1 | 2/2015 | Lochtefeld et al. |
| 2015/0065261 A1 | 3/2015 | Lochtefeld |
| 2015/0089731 A1 | 4/2015 | Lochtefeld |
| 2015/0107013 A1 | 4/2015 | Lochtefeld et al. |
| 2015/0204093 A1 | 7/2015 | Smythe |
| 2016/0053504 A1 | 2/2016 | Lochtefeld et al. |
| 2016/0256788 A1 | 9/2016 | Lochtefeld |
| 2016/0273236 A1 | 9/2016 | Lochtefeld et al. |
| 2017/0044784 A1 | 2/2017 | Slater et al. |
| 2017/0080348 A1 | 3/2017 | Mladick |
| 2017/0128846 A1 | 5/2017 | Lochtefeld |
| 2017/0138074 A1 | 5/2017 | Lochtefeld et al. |
| 2017/0247895 A1 | 8/2017 | Webber |
| 2018/0264368 A1 | 9/2018 | Lochtefeld |
| 2018/0320395 A1 | 11/2018 | Odriozola Sagastume |
| 2019/0063092 A1 | 2/2019 | Fincham et al. |
| 2019/0203487 A1 | 7/2019 | Fincham et al. |
| 2019/0226223 A1 | 7/2019 | Slater et al. |
| 2020/0256073 A1 | 8/2020 | Fincham et al. |
| 2023/0166195 A1 | 6/2023 | McFarland et al. |
| 2023/0243171 A1 | 8/2023 | Lochtefeld |

FOREIGN PATENT DOCUMENTS

| | | |
|---|---|---|
| AU | 2004240161 B1 | 4/2006 |
| CN | 1214402 A | 4/1999 |
| CN | 1231015 A | 10/1999 |
| CN | 101084352 A | 12/2007 |
| CN | 101387260 A | 3/2009 |
| CN | 201679617 U | 12/2010 |
| CN | 202248991 U | 5/2012 |
| CN | 103443374 A | 12/2013 |

(56) References Cited

FOREIGN PATENT DOCUMENTS

| | | |
|---|---|---|
| DE | 10 2005 003815 A1 | 8/2006 |
| EP | 2123850 A1 | 11/2009 |
| EP | 3 610 097 B1 | 9/2020 |
| FR | 3 065 239 A1 | 10/2018 |
| JP | H0238667 A | 2/1990 |
| WO | WO-98/03753 A1 | 1/1998 |
| WO | WO-00/05464 A1 | 2/2000 |
| WO | WO-2005/023634 A2 | 3/2005 |
| WO | WO-2006/060866 A1 | 6/2006 |
| WO | WO-2008/034631 A1 | 3/2008 |
| WO | WO-2008/102035 A1 | 8/2008 |
| WO | WO-2010/059871 A1 | 5/2010 |

OTHER PUBLICATIONS

Certified English translation of: Boussinesq M.J., "Théorie de l'intumescence liquide, appelée onde solitaire ou de translation, se propageant dans un canal rectangulaire," C.-R. Acad. Sci. Paris, 72(1871), p. 755-59.).

Lord Rayleigh. "On Waves." *The London, Edinburgh, and Dublin Philosophical Magazine and Journal of Science*, 5th Series, vol. 1, No. 4, Apr. 1876, pp. 257-279.

Pahl Dixon, "Some Guy's Dreams," Surfing Magazine, Western Empire Publications, San Clemente, California. Aug. 1998, five (5) pages.

\* cited by examiner

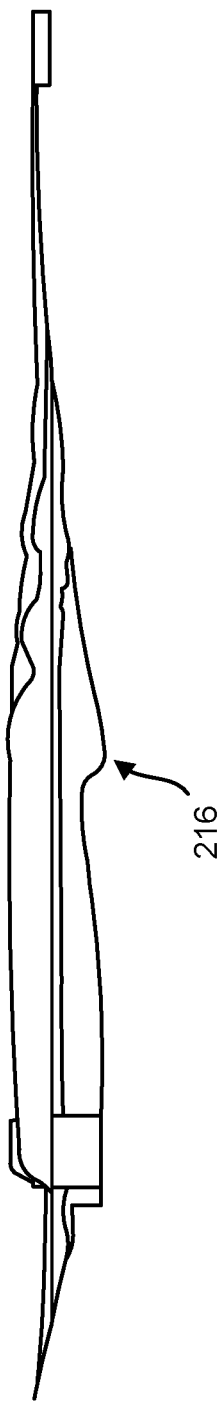
FIG. 5A
FIG. 5B

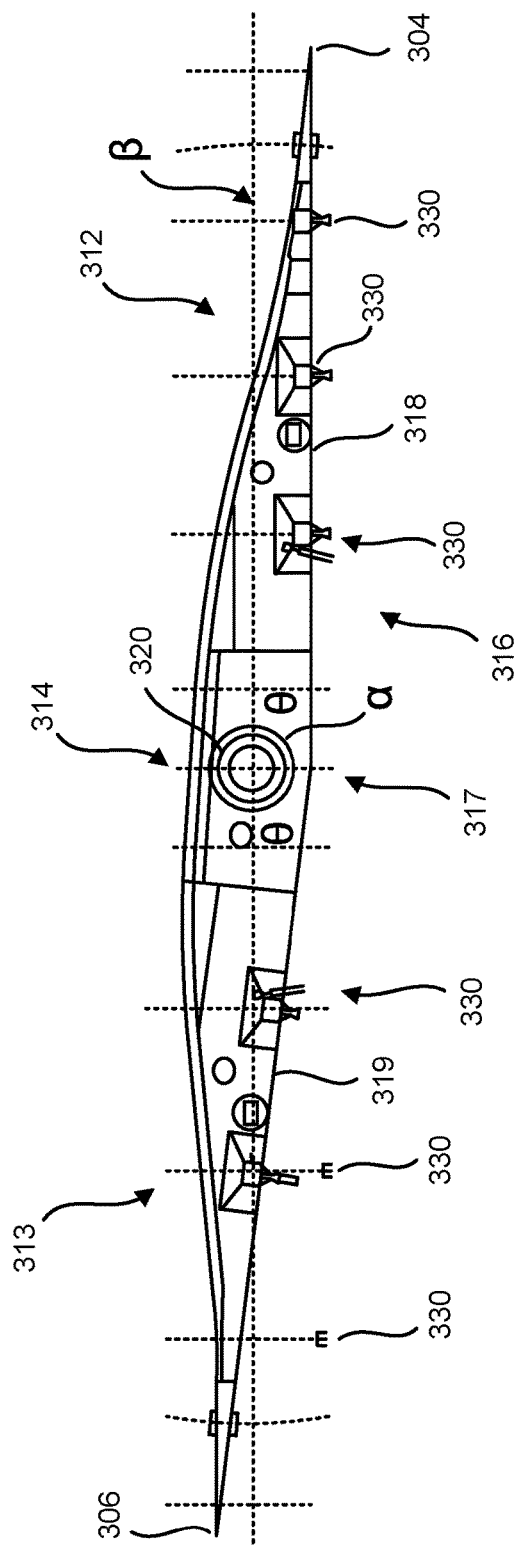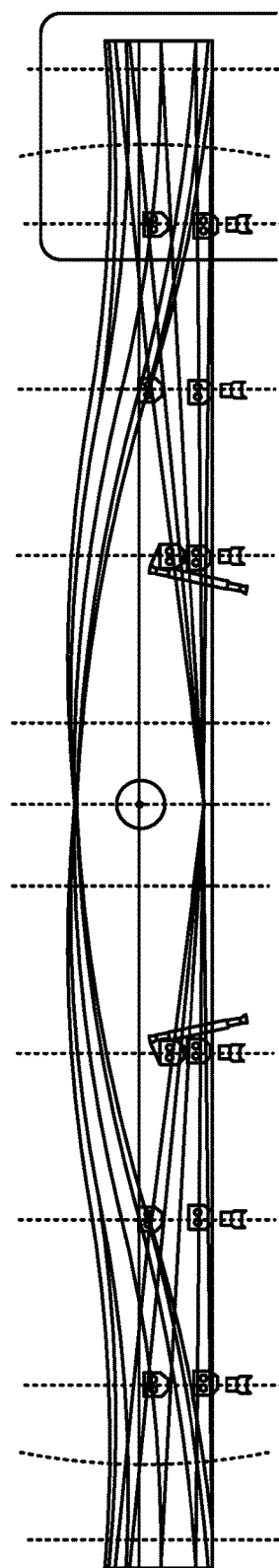
FIG. 9A
FIG. 9B

WAVE POOL AND WAVE GENERATOR FOR BI-DIRECTIONAL AND DYNAMICALLY-SHAPED SURFING WAVES

BACKGROUND

Ocean waves have been used recreationally for hundreds of years. One of the most popular sports at any beach with well-formed, breaking waves is surfing. Surfing and other board sports have become so popular, in fact, that the water near any surf break that is suitable for surfing is usually crowded and overburdened with surfers, such that each surfer has to compete for each wave and exposure to activity is limited. Further, the majority of the planet's population does not have suitable access to ocean waves in order to even enjoy surfing or other ocean wave sports.

Another problem is that the waves at any spot are varied and inconsistent, with occasional "sets" of nicely formed waves that are sought after to be ridden, interspersed with less desirable and, in some cases, unrideable waves. Even when a surfer manages to be able to ride a selected wave, the duration of the ride usually lasts only a few seconds, with most rides being between 5 and 10 seconds long. For both recreational and competitive surfing, consistency, control of variability, size and shape are key and long-sought aspects of man-made waves.

Various systems and techniques have been employed in an attempt to replicate ocean waves in a man-made environment. However, none of these systems and techniques thus far has generated an optimal wave, except, for example, as disclosed in U.S. Patent Publication No. 2010/0124459, the contents of which are incorporated by reference herein in their entirety. Some of these systems will generate what is known as a classical Kelvin wake pattern, which instead of creating a large solitary wave, distributes wave energy into multiple, smaller auxiliary waves, or "wakes." Still yet another problem with other artificial waves and wave pools are a lack of bi-directionality, and the tendency for an artificial wave generator to also generate in the constrained pool a significant amount of chop, reflective waves, and seiche.

SUMMARY

This document describes a wave pool, wave generation mechanism, and wave generating foil for generating a dynamic and optimal surfing wave in a body of water.

In some aspects, a wave pool is described. The wave pool has a length or a circumference, and includes a channel for containing water at a mean surface level, the channel having a first side and a second side. At least a portion of the channel has a cross-section, between the first side and the second side normal to the length, that includes a deep region in the channel at least partially along the length of the wave pool and proximate the first side, the deep region having a mean first depth below the mean surface level of the water contained in the channel. The cross-section further includes a reef at least partially along a length of the deep region, the reef extending upward and away from the deep region to a mean second depth that is shallower than the mean first depth of the deep region. The cross-section further includes a beach region that slopes up away from the reef toward the second side to expose a beach above the mean surface level of the water, the beach region having a convex parabolic shape with a slope that decreases toward the second side of the channel.

In other aspects, a wave generator is disclosed for generating a wave in a pool of water, while having bi-directionality. The wave generator a foil having a vertical front surface defined by a proximal edge, a distal edge, a bottom edge and a top edge, the vertical front surface being substantially symmetrical around a central vertical axis between the proximal edge and the distal edge to provide substantially equal respective first and second wave forming surfaces. Each of the first and second wave forming surfaces have a horizontal cross-sectional geometry that is concave about a front vertical axis in front of the vertical front surface thereof between a point defined by the respective proximal or distal edge and a midsection of the foil. The foil has rotation in a yaw angle about the central vertical axis to at least a first position and a second position, each of the first and second positions forming a leading surface of one of the first and second wave forming surfaces, and forming a trailing surface of the other of the first and second wave forming surfaces. The rotation to the first or second position enables the leading surface to exert drag against the water when the foil moves in a horizontal direction perpendicular to the central vertical axis to generate a primary wave in the pool, and enables the trailing surface to decrease the drag of the leading surface to minimize oscillatory waves that trail the primary wave from the water that moves past the leading surface.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 5A and 5B illustrate cross sections of the channel with and without the first trough;

FIGS. 9A and 9B are downward, cross-sectional views of a foil in accordance with the disclosure herein, as well as a yaw angle rotation thereof;

DETAILED DESCRIPTION

This document describes a wave pool and a wave generator, for generating one or more waves in the wave pool. The wave pool includes a channel of water defined by a first side and a second side, a track proximate to the first side, and at least one foil that traverses the channel via the track, the at least one foil generating a wave in the channel of water. The channel can be linear or curvilinear, such as an arc, a semi-circle, or a circle. The channel can include a number of sections, each of which can be one of a linear section, a curvilinear section, or a combination thereof. The track can be at least partially in the water contained by the wave pool, or out of the water outside the first side of the channel.

Figure 1:
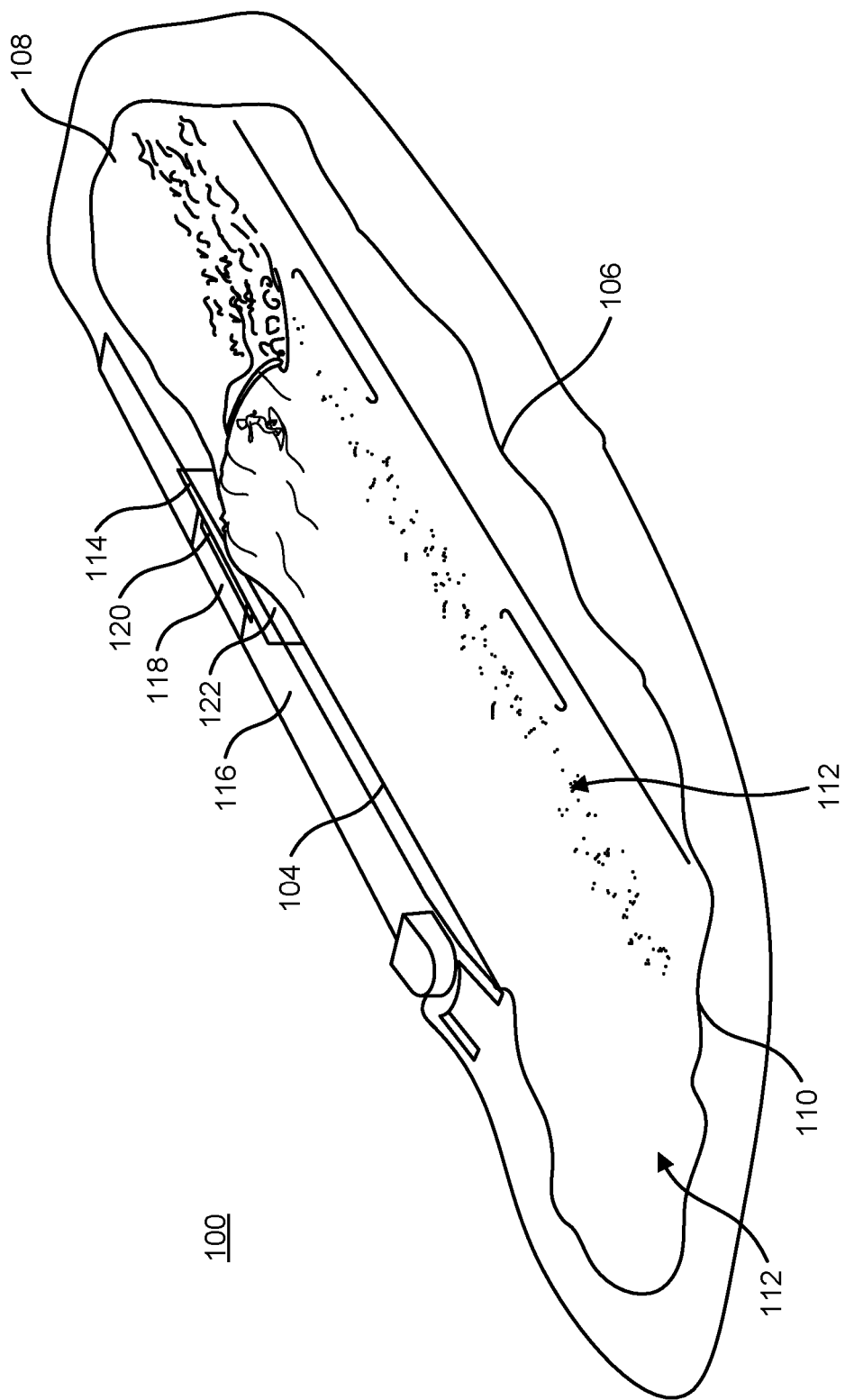
FIG. 1 illustrates a wave pool in accordance with a description herein.

FIG. 1 illustrates a wave pool 100 formed of a channel 102 that is bounded and defined by a first side 104, a second side 106, a proximal end 108 and a distal end 110. The terms "first," "second," "proximal" and "distal" are for reference only, particularly for a channel that is symmetrical about a middle or latitudinal axis. The channel 102 of wave pool 100 is shown as substantially linear, or having a substantially linear section, however the channel 102 can be curvilinear or have one or more curvilinear sections. In some implementations, i.e. a circular or oval-shaped wave pool 100 or the like, the channel 102 is defined only by a first side 104 and a second side 106, each having a diameter.

The channel 102 is configured to hold or contain water, and has a bathymetry 112, or bottom surface topography, that is configured to cooperate with a wave generator 114 to form at least one surfable wave in the wave pool 100. As will be described in further detail herein, the bathymetry 112 can include one or more deep regions for containing a volume of water, one or more reefs or sills of varied size and depth and against which wave energy can be concentrated to produce the surfable waves, one or more troughs, one or more beaches, and/or one or more gutters for absorbing residual wave energy and water volume created thereby, and returning that water volume toward a deeper part of the channel.

The wave pool 100 further includes a track 116 along which one or more wave generators 114 can be conveyed. The track 116 can include one or more rails or pathways or the like. Each wave generator 114 can include a vehicle 118 adapted for being conveyed along the track 116, such as by wheels attached to the vehicle 118, which form at least part of a bogie 120 that can include the wheels and other framing, struts, electronics, and batteries. In some implementations, the bogie 120 can further include one or more solar panels for localized energy generation and storage. The vehicle 118 can further include a number of sensors and stabilization mechanisms for tracking telemetry data of the movement of the vehicle 118, as well as stabilize the vehicle 118 on the track 116 during its traversal or reversal on the track 116.

The vehicle 118 in turn is connected to, and carries, one or more foils 122 at are vertically positioned at least partially in the water of the channel 102, and which provide a unique surface for generating the wave energy substantially laterally from the foil 122. In many instances, the foil is also shaped and configured for flow recovery or "suck-out" after the main wave energy is generated, so as to minimize oscillatory waves following the initial solitary wave energy in which most or substantially all of the wave energy is concentrated. In some implementations, the foil 122 is shaped and configured to be bi-directional in the wave pool 100, so as to generate either a "right" breaking wave or a "left" breaking wave, depending on a direction of the foil 122 and vehicle 118 along the track 116.

The traversal of the vehicle 118 along the track 116 can be controlled and modulated so as to provide specific or desired acceleration, deceleration, velocity and distance of the foil(s) in the channel 102. For example, in operation, a speed of the foil 122 can be varied down the channel 102. Such variability can be programmed by software and executed by a control computing system to control mechanics such as a winch or pulley system. Further, the speed variations of the foil 122 can be coordinated with changes in bathymetry along the channel 102, which bathymetric changes can include a dynamically adjustable and changeable reef. Similarly, a yaw angle, pitch angle, surface area, and buoyancy of the foil(s) can be independently controlled and modulated to provide specific or desired generated wave energy from the surface of each foil. Accordingly, dynamics changes to either or both of the foil 122 or bathymetry of the channel 102 can provide a limitless number of waves, some of which can be programmed and branded (i.e. "Teahupoo," "Cloudbreak," or "Trestles" for example) and licensed for use in a wave pool installation.

Figure 2:
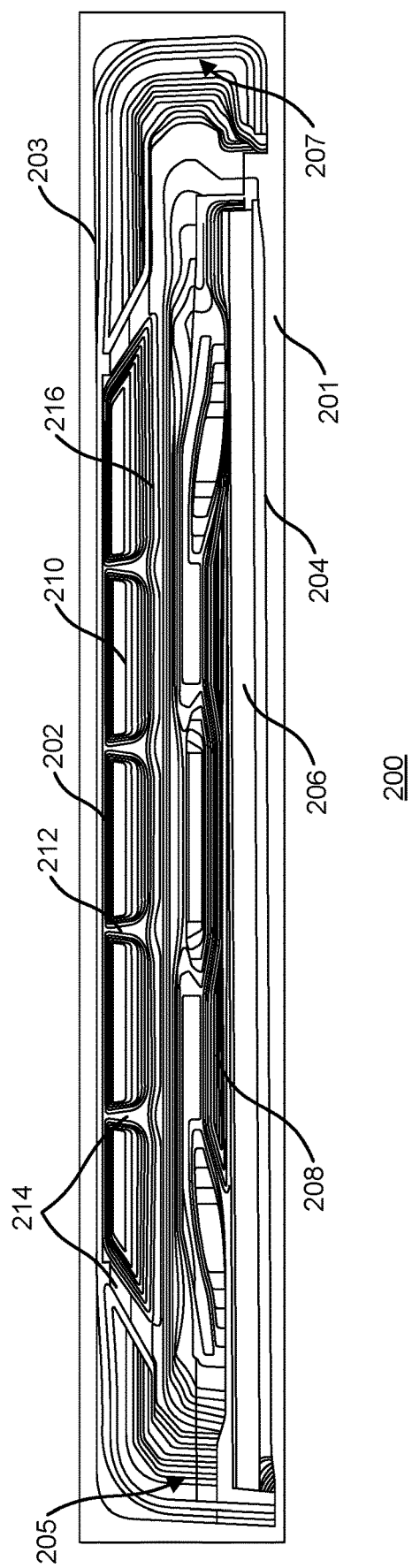
FIG. 2 illustrates a channel for a wave pool in accordance with the description herein.
Figure 3:
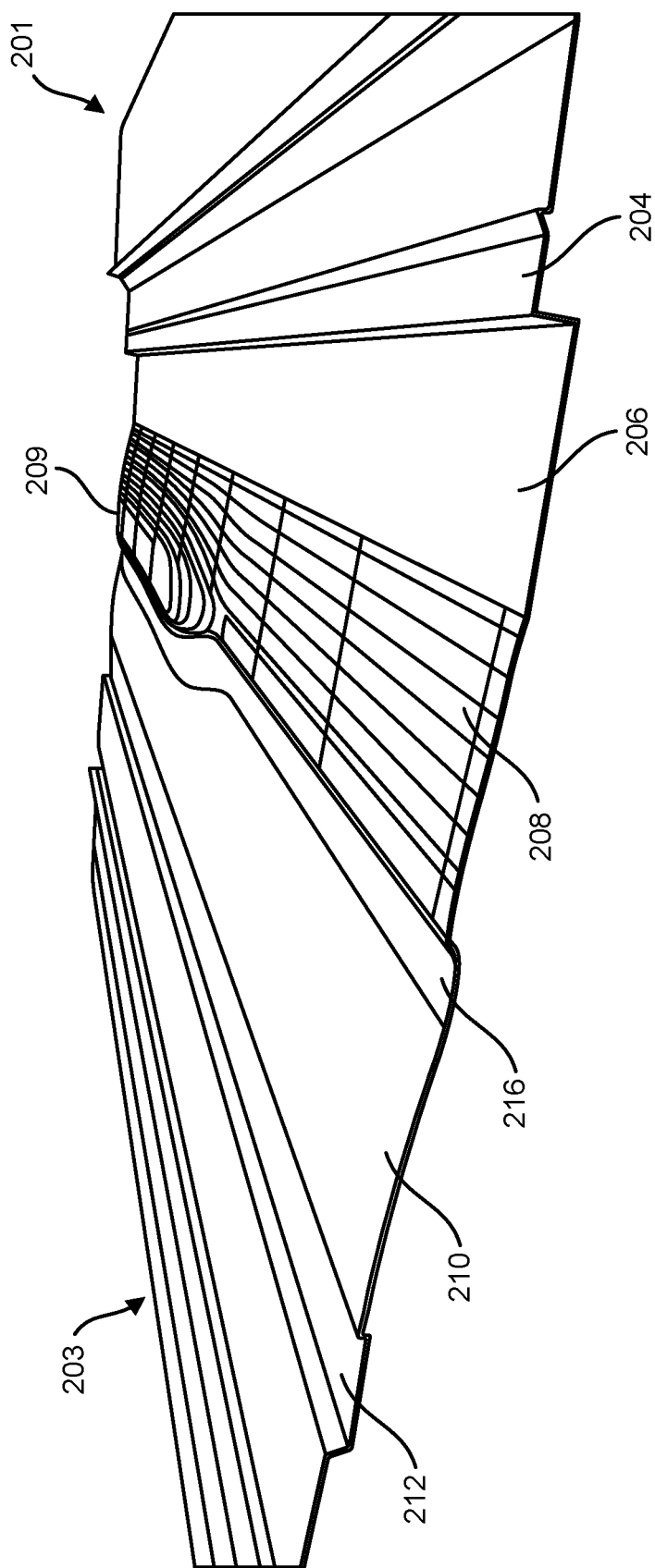
FIG. 3 is a perspective view of a portion of the length of a channel of a wave pool.
Figure 4:
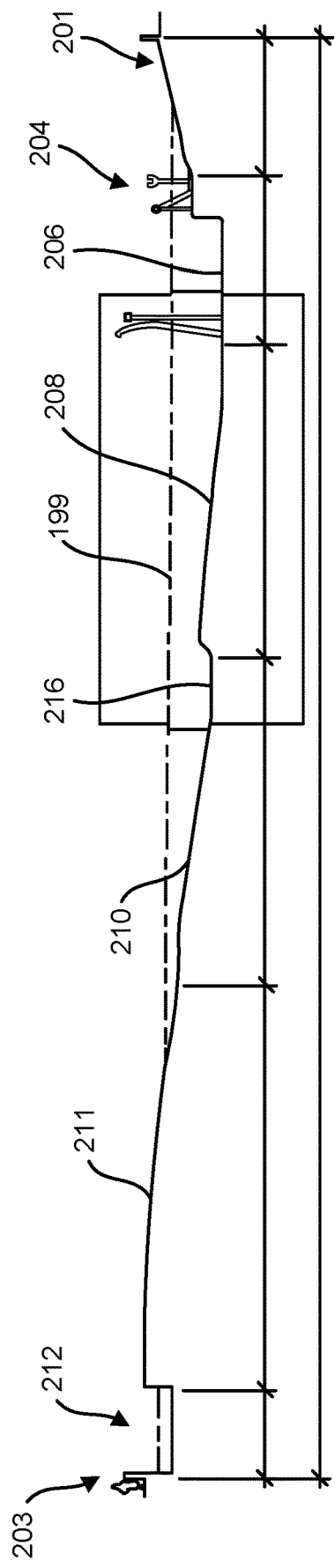
FIG. 4 is a cross-sectional view of a portion of the channel, in a perspective normal to the length (or circumference) of the channel of a wave pool.

FIG. 2 illustrates a channel 200 for a wave pool in accordance with the description herein. FIG. 3 is a perspective view of a portion of the length of the channel 200, and FIG. 4 is a cross-sectional view of the portion of the channel 200, in a perspective normal to the length (or circumference) of the channel 200. The channel 200 is illustrated in FIG. 2 as a linear channel, but can also be curvilinear, circular, oval, parabolic, or other shape. The channel 200 has a bathymetry that has been shaped and formed for specific applications and/or generating a particular type or types of surfing waves. As such, the description of the bathymetry of the channel 200 herein is exemplary only, and those of skill in the art would recognize that many forms of bathymetry, such as bathymetric relationships, etc., are within the scope of this document.

In some implementations, the channel 200 includes and is defined by a first side 201, a second side 203, a proximal end 205, and a distal end 207. The terms "first," "second," "proximal" and "distal" are for reference only, particularly for a linear channel that is substantially symmetrical about a middle or latitudinal axis. A circular or oval-shaped channel 200, or the like, includes and can be defined by a first side 201 and a second side 203, each having a diameter to form the channel 200 therebetween.

The channel 200 has a length or a circumference, and is formed for containing water at a mean surface level 199. A cross-section of the channel 200, as can also be seen in FIGS. 3 and 4, between the first side 201 and the second side 203 normal to the length or radial to the circumference, includes a contour or bathymetric section for cooperating with a moving foil for forming a surfable wave. Accordingly, a cross section of at least a portion of the channel 200, for at least a portion of the length or circumference of the channel 200 includes a track region 204 proximate the first side 201, on or in which a track can be deployed, and along which a vehicle and the foil(s) can travel. The channel 200 further includes a deep region proximate the first side 201 and/or the track region 204. In some instances, the track region 204 can form part of the deep region 206, while in other instances the track region 204 is separated from the deep region 206 by a wall or shell or the like.

The deep region 206 has a mean first depth below the mean surface level 199 of the water contained in the channel 200. The bathymetry of the channel 200 further includes a reef 208 at least partially along a length of the deep region 206, the reef 208 extending upward and away from the deep region 206 to a mean second depth that is shallower than the mean first depth of the deep region 208. The reef 208 can have various contours and shapes both along its length and across a top surface of the reef 208. The top surface 208 can be uniform in depth, or may include one or more hills, valleys, bumps, and variances, such as friction-forming mechanisms. In some implementations, the reef 208 can be formed from concrete or other rigid shapeable material. In other implementations, at least part of the reef can be formed of reef modules, described in further detail below, that can connect together to provide custom variability or specific depths or shapes of the reef 208. The reef modules can be formed of concrete, stainless steel, plastic, high-density foam, or other rigid or semi-rigid material. For instance, in some implementations, some reef modules can be formed of an elastomer such as rubber. At least some of the reef modules can be provide a soft top surface for the reef 208, and/or include one or more wave damping mechanisms, as described in further detail below with respect to FIGS. 6 and 7.

The channel 200 further includes a beach region 210 that slopes up away from the reef 208 toward the second side 203 to expose a beach 211 above the mean surface level of the water 199, as shown in FIGS. 3 and 4. The beach 211 can extend 1 to 6 feet, or higher, above the mean surface level of the water 199 in the channel 200. The beach region 210 includes a convex (relative to a downward view) parabolic shape, with a slope that begins in the water near the reef 208, and which slope decreases toward the second side 203 of the channel 200, to eventually expose the beach 211, by which point the beach region is close or substantially horizontal. The first objective of the convex parabolic shape of the beach region 210 is to completely eliminate the reflected wave of the first main wave, by spreading in length (in both the direction of travel and lateral direction) the energy contained in swell or whitewater without giving it any upward/downward momentum. The convex shape will also compress and suppress smaller waves within the rush of water displaced by the main surfing wave, essentially damping out waves that refract or reflect between the surface of the beach region 210 and the mean surface 199 of the water.

In some implementations, the channel 200 can include a first trough 216 adjacent the reef 208 opposite the deep region 206. The first trough 216 has a mean third depth that is deeper than the mean second depth of the reef 208. The first trough 216 can absorb some of the wave energy from a wave, and allow the wave to reform and break against the beach region 210, and/or the wave taller by turning a boxy barrel in a more vertical "almond" shape. Without the first trough 216, a barrel of the wave, if the wave energy is sufficient to cause the wave to barrel, can be deeper and longer, allowing more space for a surfer to "get in the barrel." FIGS. 5A and 5B illustrate cross sections of the channel with and without the first trough 216. As can be seen, where the reef 208 extends to the beach region 210, a barrel of the wave extends longer, as the extended reef allows a bottom of the wave to slow down with respect to a top of the wave, which barrels over the slowing bottom water of the wave.

In some implementations, the channel 200 includes a gutter 212 between the beach 211 and the second side 203 of the channel 200. The gutter 212 is defined by a first side, a bottom and a second side. The first side of the gutter 212 descends from the beach 211 to the bottom of the gutter 212, which has a mean fourth depth below the mean surface level 199 of the water in the channel 200. The second side ascends from the bottom of the gutter to a height above the mean surface level 199 of the water. The back wall of the gutter 212 could be substituted with another convex beach, leading to a lagoon or other water feature. The gutter 212 can further include obstacles or other current-impeding mechanisms.

In exemplary implementations, the gutter 212 has dimensions to provide a volume relative to a volume of water of a wave that washes over the beach 211 and into the gutter. In some cases, the gutter will receive 20 to 80 percent of the volume of water in the wave that washes over the beach 211, and in preferred exemplary implementations, the ratio is approximately 50%. The capacity of the gutter 212 is relative to the volume of water in the wave. On a per foot basis, the mean fourth depth of the gutter 212 is about half the height of the wave, and half of the length of the wave from the peak of wave to end of the wave. One or more water returns 214, such as channels from the gutter 212 through at least part of the beach region 210, can be provided to guide water in the gutter 212 back toward the channel 200, i.e. toward the deep region 206 of the channel 200. Depending on the linearity or shape of the channel 200, the water returns 214 can be directed horizontally back to the channel 200, or may be angled, such as angled 20-80 degrees against a mean water flow in a direction of the moving foil. In yet other implementations, as shown in FIG. 2, water returns at the proximal and distal ends can be angled toward those ends, respectively, while intermediate water returns 214 are directed straight back toward the channel 200. In yet other implementations, the water returns 214 can flare out from a narrow, deep portion to a wider but shallower topography. The number of water returns 214 can be selected to inhibit water recirculation at either end of the gutter 212. In yet other implementations, the gutter 212 can include gratings and/or cavities linked to pipes toward the deep area which can either replace or augment the water returns.

In some implementations, the gutter 212 and/or water returns 214 can include one or more flow control mechanisms, such as a net with a measured degree of porosity, or a steerable vane or paddle, to control the flow of water therein. The flow control mechanisms can be padded to ensure safety of persons in the water.

Figure 6A:
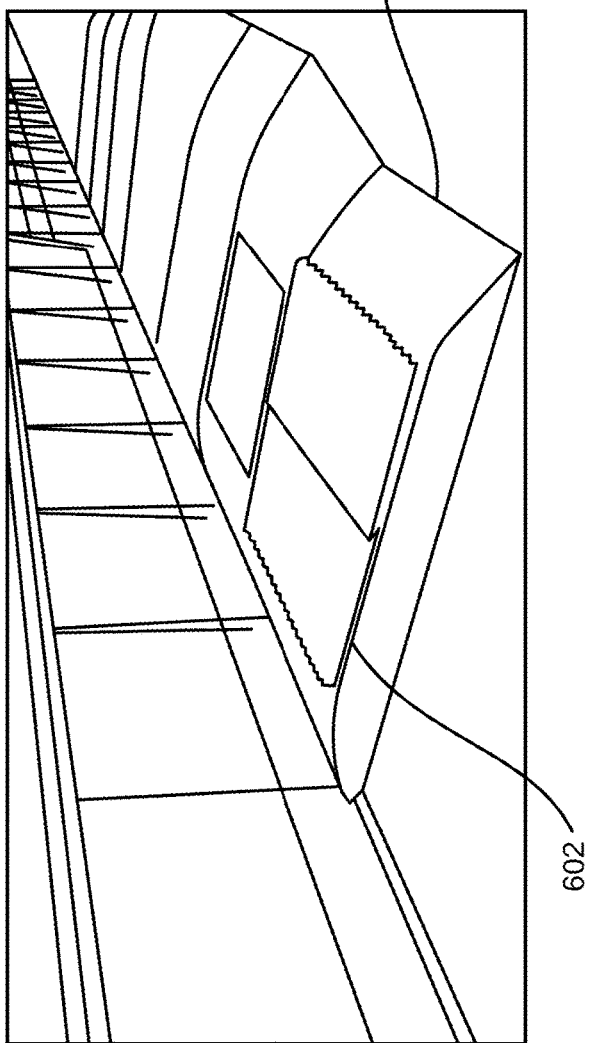
FIG. 6A illustrates a reef module that can form part or all of a reef section of a reef in a channel of a wave pool.
Figure 6B:
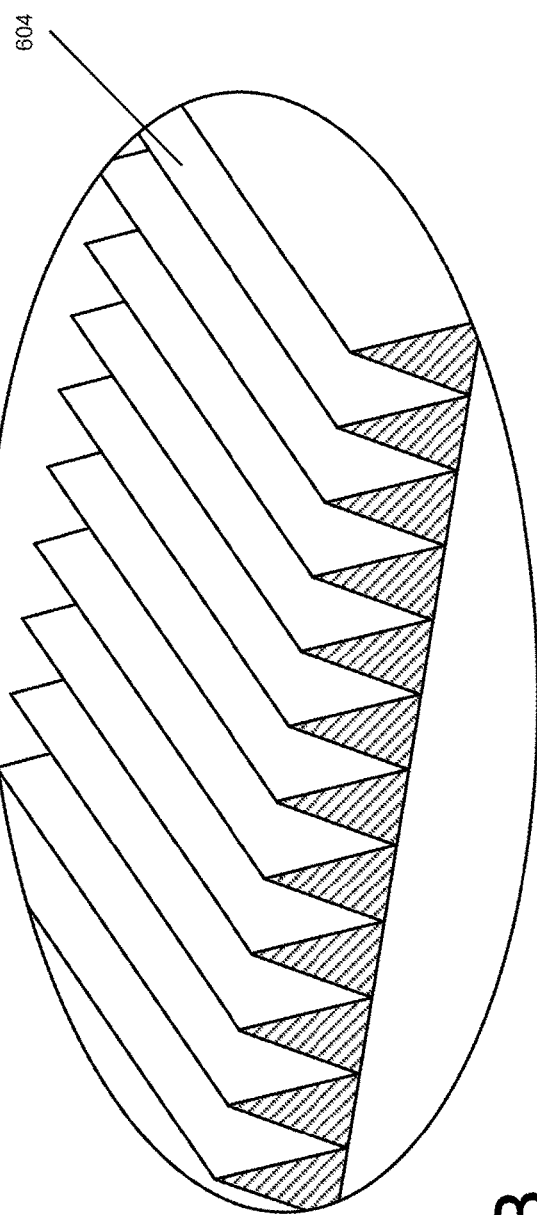
FIG. 6B is a close up view of the reef module of FIG. 6A including a soft top with texture members in accordance with the disclosure herein.

FIG. 6A illustrates a reef module 600 that can form part or all of a reef section of a reef in a channel of a wave pool. The reef module 600 can be formed of any material suitable to maintain its general shape, so as to withstand a large amount of water pressure from wave energy that it compresses in order to form a wave from the wave energy. The reef module 600 can have a rigid bottom or core, with a flexible or pliable outer our upper surface. In some instances, the reef module 600 includes a soft top 602. The soft top 602 can provide a surface against which a surfer can fall and minimize potential injury. The soft top 602 can include a number of texture members 604 for providing additional wave damping and friction forming, as well as current control proximate the upper surface of the reef module 600. FIG. 6B is a close up view of the soft top 602 with texture members 604.

In some instances, the texture members 604 can include one or more ridges, flaps, valleys, grooves, sponges (which can mimic coral reefs, for instance), or real or artificial sea vegetation. The one or more texture members 604 can be attached to the top surface of the reef module 600, such as in parallel alignment in an array, and can be attached by a mechanical anchor or other attachment mechanism. The one or more texture members 604 can be attached or detached depending on a desired damping or friction needing to be formed. In some instances, the texture members 604 are formed of a durable material, such as a rubber of appropriate durometer, that can withstand chlorine and/or ultraviolet (UV) light breakdown, while still maintaining pliability or flexibility. The one or more texture members 604 can also be quickly interchangeable with new and/or different-sized texture members 604. The texture members 604 can be planar, angular, or rounded, and can include any number of holes, apertures, baffles, or outer surface texturing. In some implementations, sharp edges are avoided as a surfer may eventually contact the reef module 600.

Figure 7B:
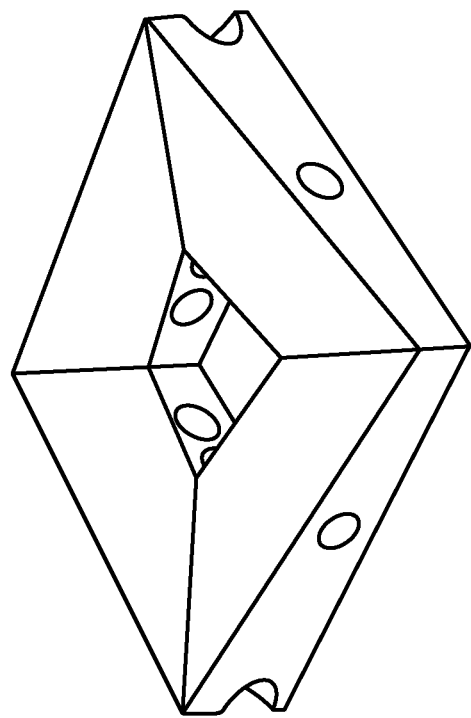
FIGS. 7A and 7B show alternative implementations of a reef module.
Figure 7A:
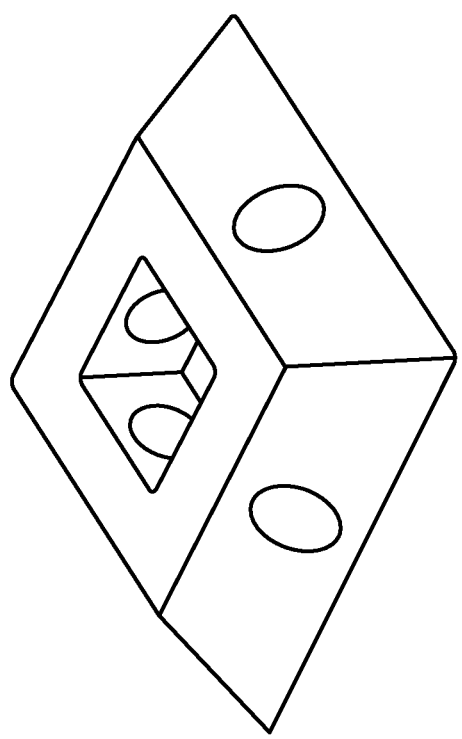

FIGS. 7A and 7B show alternative implementations of a reef module 700 and 702, respectively. FIG. 7A shows a reef module 700 as a hollow, truncated pyramid, with one or more holes or apertures extending from an outer surface of the reef module 700 to an inner space. FIG. 7B shows a reef module 702 also as a hollow three-dimensional shape, but as truncated at an angle. A reef module can include one or more of an air-fillable bladder, a water-fillable bladder, or other elastomeric shape that can change in volume by being filled or depleted of a fluid. Alternatively, the reef module 700 or 702, can include a mechanical or pneumatic moving system to raise or lower at least a portion of the reef module, such as a top surface, or the entire module, to a desired height and/or angle from the bottom of the channel to dynamically adjust and alter the shape of the reef at the position of the respective reef module 700, 702.

In cooperation with the bathymetry of a channel of a wave pool as described above, the other key component for generating an optimal surfable wave is a wave generator to generate wave energy substantially laterally in the wave pool (i.e. normal or orthogonal to the direction of travel of the wave generator, and across the length of the channel). As described in U.S. Patent Publication No. 20130061382, the contents of which are incorporated by reference herein for all purposes, the wave generator includes at least one foil having a curvilinear cross-sectional geometry that includes a leading surface that is concave about a vertical axis to provide and maximize drag of water against the leading surface, thereby generating wave energy laterally from the leading surface of the foil to form a primary wave. The concavity extends to an inflection point to turn convex toward a maximum width, beyond which is a trailing surface. To maximize this wave energy, the foil further includes the trailing surface that narrows from the maximum width of the foil adjacent the leading surface to a point at an end of the foil, where the trailing surface decreases the drag of the foil and minimizes oscillatory waves that trail the primary wave from the water moving past the leading surface of the foil. The trailing surface can also include a convex surface from the maximum width to an inflection point after which the trailing surface becomes concave.

In some aspects, the trailing edge is partially designed such that the water elevation on both sides of the recovery part of the foil match each other when they meet at the very tip in order to reduce vortex generation. Sometimes, a small vortex with little effect on foil efficiency can be present on purpose for lateral force reduction, meaning both waterlines do not perfectly match at the respective tips.

To maximize the primary wave, it was determined that a length of the trailing surface must exceed a length of the leading surface, and any degree of concavity of the trailing surface, if any, must be much less than the degree of concavity of the leading surface. Thus, for a foil that is adapted for movement by a moving mechanism in only one direction along the first side of a linear or circular pool, the foil is asymmetrical, and therefore not adapted for bi-directional movement. Accordingly, prior foils could not be bi-directional, and could not generate both an optimal "right" and "left" breaking wave.

In accordance with implementations described herein, a wave generator includes one or more foils, where each foil is bi-directional and substantially symmetrical around a vertical axis. In order to compensate for the symmetry, in reference to prior foils, the foil described herein is able to pivot in a yaw angle to expose more concavity on a leading surface, and lessen the recovery concavity on a trailing surface, depending on which direction the foil is moving. Thus, the bi-directional foil of the present disclosure can approximate the length-wise shape, dimensions, and characteristics of an optimal uni-directional foil.

Figure 8A:
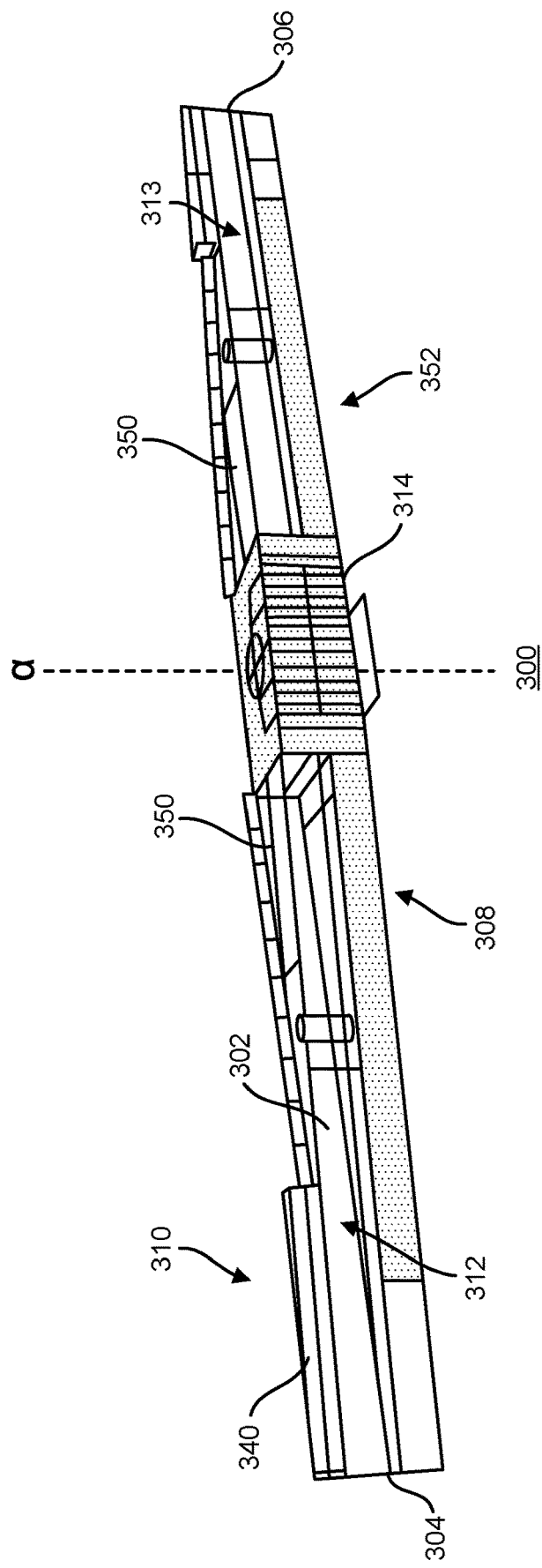
FIGS. 8A and 8B are perspective views of a foil in accordance with the disclosure herein.
Figure 8B:
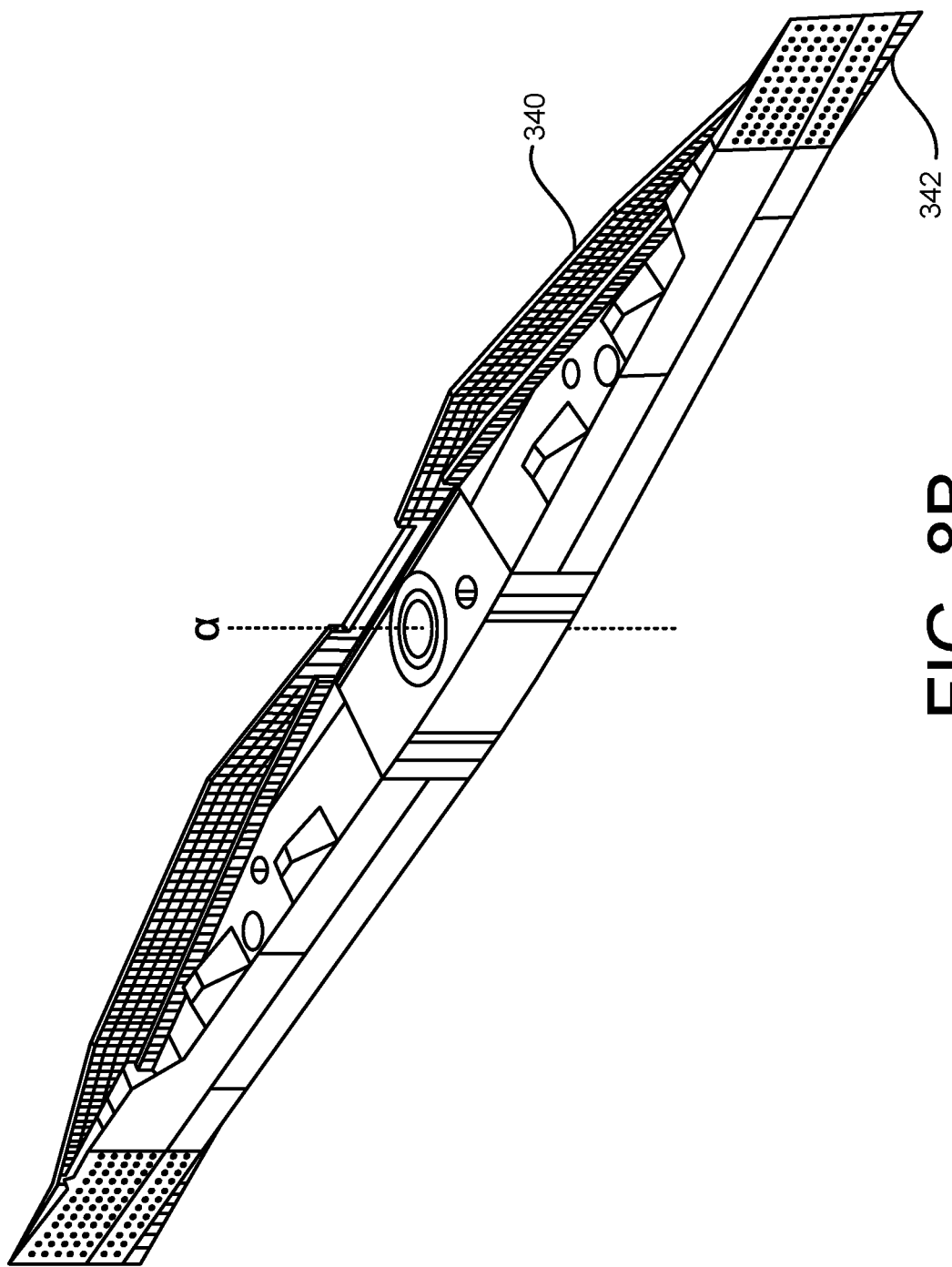

FIGS. 8A and 8B are perspective views of a foil in accordance with the disclosure herein. As shown in FIG. 8A, a foil 300 for a wave generator includes a vertical front surface 302 (i.e. the surface that would be facing toward the reef in the channel). The front surface 302 is defined by a proximal edge 304, a distal edge 306, a bottom edge 308 and a top edge 310. The vertical front surface 302 is substantially symmetrical around a central vertical axis α between the proximal edge 304 and the distal edge 306, to provide substantially equal respective first and second wave forming surfaces 312 and 313, each of the first and second wave forming surfaces 312, 313 having a horizontal cross-sectional geometry that is concave about a front vertical axis in front of the vertical front surface thereof between a point defined by the respective proximal or distal edge 304, 306 and a midsection 314 of the foil. Both wave forming surfaces 312, 313 contribute to forming the wave, either acting as a leading edge to provide drag against the water to generate a primary wave, or as a trailing edge for flow recovery and minimizing oscillatory waves trailing the primary wave.

As shown also in reference to FIGS. 9A and 9B, the foil 300 is rotatable in a yaw angle γ about the central vertical axis a to at least a first position and a second position, each of the first and second positions forming a leading surface of one of the first and second wave forming surfaces 312, 313, and forming a trailing surface of the other of the first and second wave forming surfaces 312, 313. The rotation to the first or second position enables the leading surface to exert drag against the water when the foil 300 moves in a horizontal direction substantially perpendicular to the central vertical axis, in a direction β, to generate a primary wave in the pool, and enables the trailing surface to decrease the drag of the leading surface to minimize oscillatory waves that trail the primary wave from the water that moves past the leading surface. In some implementations, the foil 300 includes a vertical back surface having a V-shape outward about the central vertical axis α, with a vertex 317 opposite the front surface at the midsection 314 of the foil, and substantially straight or planar sides 318, 319 extending toward each of the proximal edge 304 and the distal edge 306 respectively, to form a leading back surface and a trailing back surface in the first position and the second position, respectively.

In some instances, the leading back surface is vertically oriented to be parallel to the horizontal direction β in the first position or the second position, as shown in FIG. 9A, where side 318 of back wall 316 is substantially parallel to the horizontal direction β, while in other instances, depending on the yaw angle γ, the leading back surface can be slightly off parallel to the horizontal direction β, as shown in FIG. 9B. The yaw angle γ can be controlled and locked to any angle, but preferably between 0 and 20 degrees, and more preferably between 0 and 10 degrees. The yaw angle γ can be adjusted to any increment of a radian as desired.

The central vertical axis α of the foil 300 can include a pivot bearing 320 around which the foil can pivot according to the yaw angle γ. The pivot bearing 320 can include a post 400 or other extending structure to connect with a bogie 402, as shown in FIG. 9. Actuators 330 can be controlled to push or pull opposing sides of the foil, and lock into the desired yaw angle γ. The actuators 330 can include, without limitation, hydraulic, linear motors, jack screws, belt-driven drive systems, air bags, or the like. The actuators 330 work in concert with a locking device, which locks the foil 300 in the desired yaw angle γ. Locking devices can include pins, screws, latches, or the like. The actuator and/or locking device may include a cam locking device, which includes a deflector at one or both ends of a channel (if linear), which mechanically deflects the foil into a new locking position, using a cam that disengages the locks, and pushes into a new programmed position. The programmed position can be variable. In other implementations, such an actuator/locking system can adjust not only yaw, but also pitch and roll of the foil, which adjustment can be executed dynamically during movement of the foil 300 through water.

In some implementations, the foil 300 can include a top plate 340 that extends up from the top edge 310 of one or both of the first and second wave forming surfaces 312, 313, especially the wave forming surface acting as the leading surface. The top edge 310 can extend partially or all the way along the top edge 310, and can variable heights above the top edge of the foil 300. The top plate 340 can be mechanically or manually deployable to an extended position, or mechanically or manually retracted to a retracted position. The top plate 340 can be used to dynamically increase (or decrease, if retracted) a surface area of the first and/or second wave forming surfaces 312, 313, particularly, as above, such wave forming surfaces are deployed as a leading surface for the foil 300.

In yet other implementations, the foil can include a bottom plate 342 that extends down from the bottom edge 308 of at least one, or both, of the first and second wave forming surfaces 312, 313. As with the top plate 340, the bottom plate 342 can extend partially or entirely along the bottom edge 308 of the foil 300, and can vary in a depth that it protrudes therefrom. Also, as with the top plate 340, the bottom plate 342 can be mechanically or manually deployable or retractable. The bottom plate 342 can also be used to dynamically increase (or decrease, if retracted) the surface area of the first and/or second wave forming surfaces 312, 313, particularly, as above, when such wave forming surfaces are deployed as a leading surface for the foil 300, or as further surface area for flow recovery when retracted as a trailing surface.

The foil 300 can further include a top surface 350 and a bottom surface 352, such the vertical front surface 302, vertical back surface 316, the top surface 350 and the bottom surface 352 form a three-dimensional container. The container can include one or more individual compartments. Each compartment can be air-filled and sealed, or water-filled, for buoyancy control of the foil 300. The water-filled compartments can include one or more holes, passages, apertures, slots, or the like, that can be adjustable to control an amount of water flowing through, so as to modulate a static mass of the water-filled compartments.

In some implementations, the foil 300 can have a hydrofoil, i.e. extending from the bottom surface 352, to provide lift to the foil 300 when moving through water. The hydrofoil can be steerable or tunable for a particular pitch or yaw. Such steering or tuning can occur dynamically as the foil 300 traverses the channel, to provide dynamically changing wave profiles and characteristics.

In yet other implementations, the foil 300 can include, or be attached with, a roll-adjusting mechanism to adjust a roll angle of the vertical front surface 302, so as to allow an angled departure from true vertical, i.e. 90 degrees from horizontal. Accordingly, the foil 300 can be rolled+/−up to 10 degrees. Such roll adjustment can also occur dynamically as the foil 300 traverses the channel, to further provide dynamically changing wave profiles and characteristics. The deployment of the hydrofoil, the adjustment of the roll angle, and the adjustment of the yaw angle can be done individually or in concert with at least one of the other adjustments.

Figure 10:
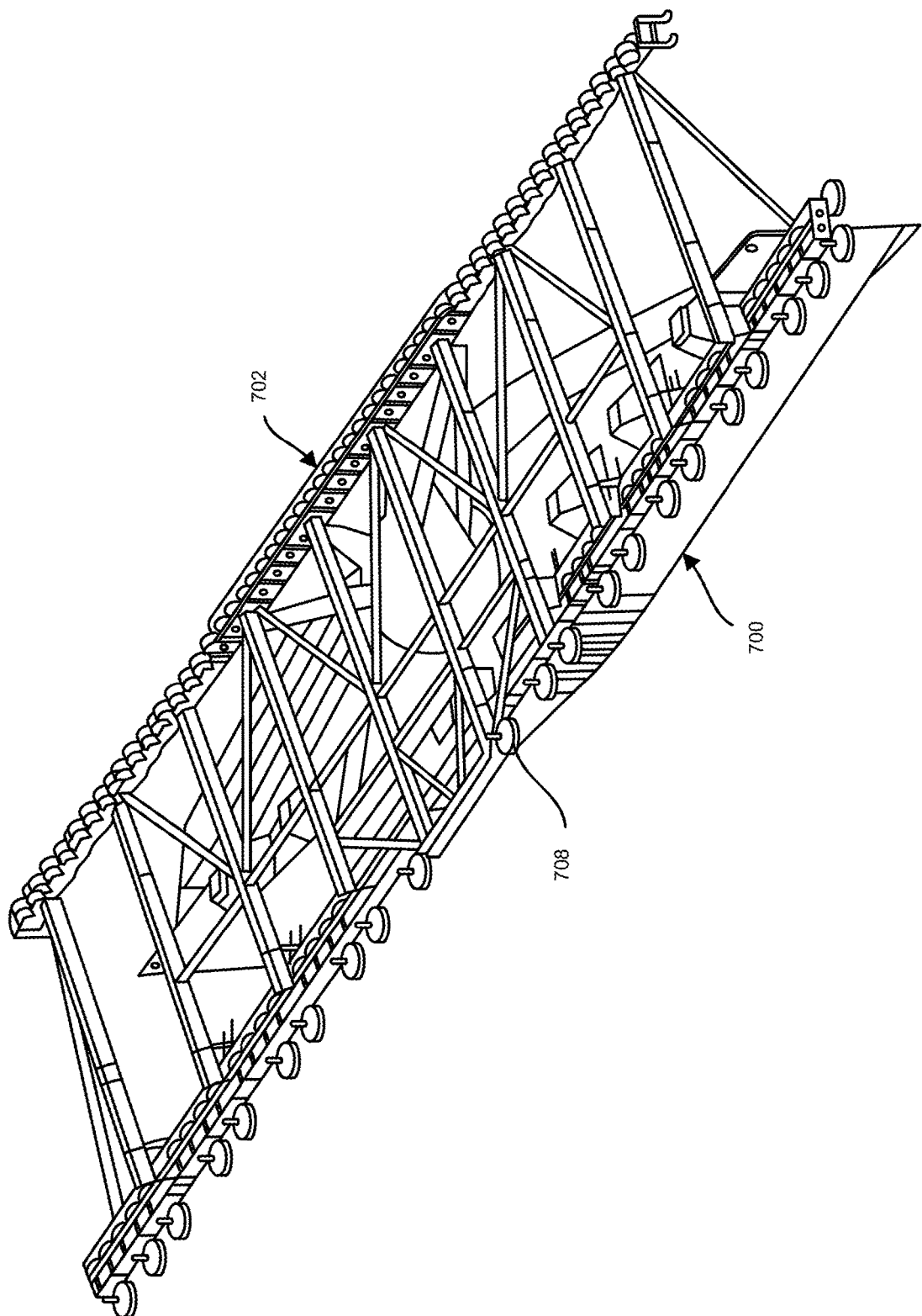
FIG. 10 is a perspective view of a foil located within a track, the foil attached to a vehicle by a bogie in accordance with the disclosure herein.

Referring back to FIG. 1, wave pools in accordance with the disclosure herein include a track 116, along which a foil is moved in the water to generate a solitary wave. The foil 300 can be attached to a vehicle by the bogie 402, as shown in FIG. 10. The bogie 402 can include a truss or system of beams and supports, to connect to a vehicle that moves along the track 116. Alternatively, the bogie 402 can incorporate the vehicle, and be moved by an external motive force such as a wench or cable-pulling engine.

Figure 11A:
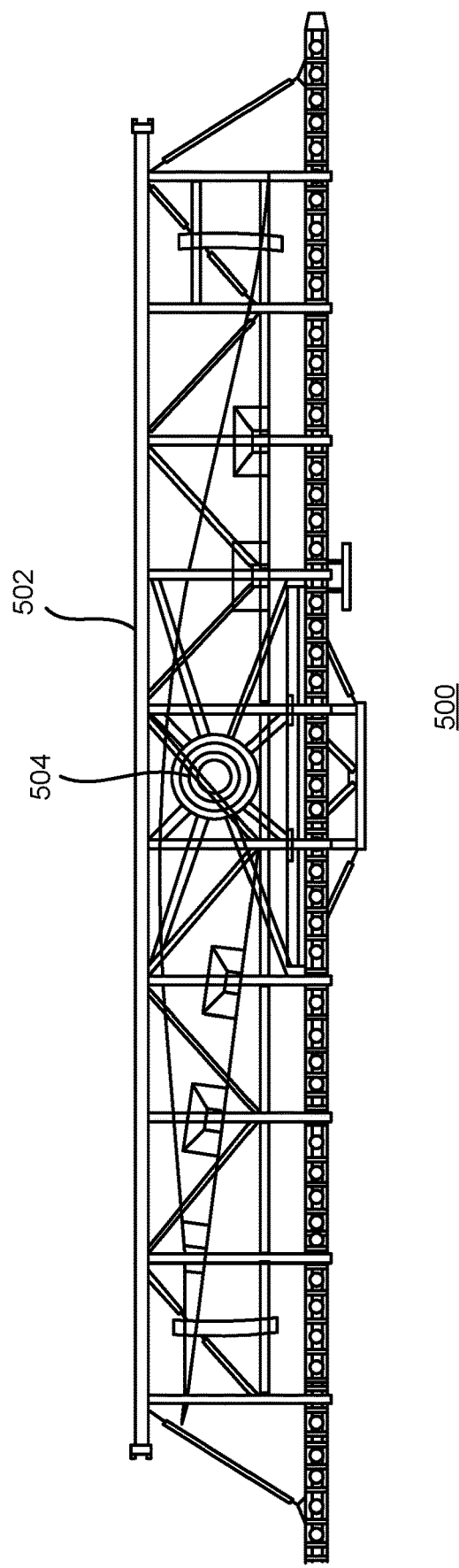
FIGS. 11A and 11B illustrate top views of an implementation of a bogie for carrying and moving a foil along a length or circumference of a channel in accordance with the disclosure herein.
Figure 11B:
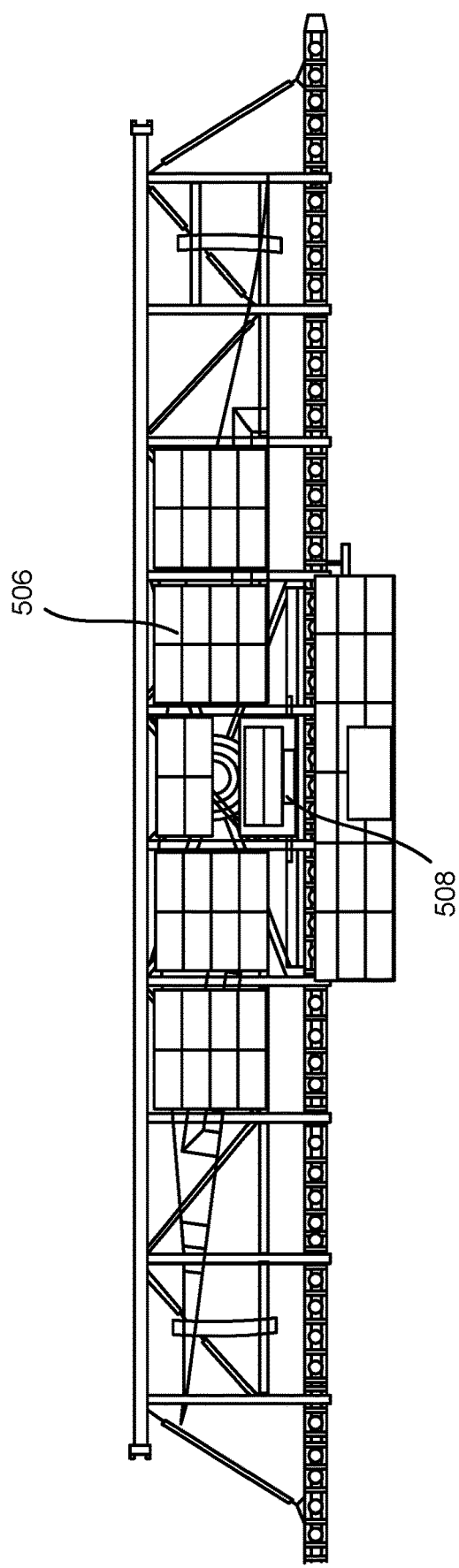

FIGS. 11A and 11B illustrate an implementation of a bogie 500 for carrying and moving a foil along a length or circumference of a channel. The bogie 500 is configured for being coupled with, and conveyed along, a track along a first side of the channel. The bogie 500 includes a truss 502 that includes a set of posts, struts, beams, or the like, to provide a supporting platform from which the foil hangs. In other implementations, the foil can be attached to a side of the bogie 500 by a set of supporting members. In still yet other implementations, the foil can extend up from a bogie and vehicle that traverses a submersed track in a deep region of a wave pool. As shown in FIG. 11B, the truss 502 can support one or more solar panels 506 for providing electricity to an inboard battery system 508, or to power any of one or more sensors and/or computer control systems.

The wave pool and/or wave generating mechanism can be outfitted with one or more sensors to provide feedback on water conditions, wave quality, or the like. For instance, in some implementations, the wave pool includes a seiche sensor at each of the proximal and distal ends of a linear or curvilinear channel, to measure the seiche cycle or periodicity of the seiche. Accordingly, the wave generating mechanism can be run in a fashion that is coordinated with the seiche cycle, i.e. to start a wave when the water level nearby is either higher or lower from the seiche. In some implementations, the sensors include capacitive wave gauges, but could also include accelerometers, speed sensors, ultrasonic sensors, or pressure sensors. Data from any of these sensors can be recorded and accumulated to further define or tune the waves in the wave pool.

Although a few embodiments have been described in detail above, other modifications are possible. Other embodiments may be within the scope of the following claims.

The invention claimed is:

1. A wave pool having a length, the wave pool comprising:
    a channel for containing water at a mean surface level, the channel having a first side and a second side, at least a portion of the channel having a cross-section, between the first side and the second side normal to the length, that comprises:

a deep region in the channel at least partially along the length of the wave pool and proximate the first side, the deep region having a mean first depth below the mean surface level of the water contained in the channel;

a reef at least partially along a length of the deep region, the reef extending upward and away from the deep region to a mean second depth that is shallower than the mean first depth of the deep region; and a beach region that slopes up away from the reef toward the second side to expose a beach above the mean surface level of the water, the beach region having a convex parabolic shape with a slope that decreases toward the second side of the channel.

2. The wave pool in accordance with claim 1, further comprising a gutter between the beach and the second side of the channel, the gutter being defined by a first side, a bottom and a second side, the first side descending from the beach to the bottom having mean fourth depth below the mean surface level of the water in the channel, the second side ascending from the bottom to a height above the mean surface level of the water.

3. The wave pool in accordance with claim 2, further comprising one or more water return channels from the gutter through at least part of the beach region, to guide water in the gutter back toward the deep region.

4. The wave pool in accordance with claim 1, wherein the mean second depth of the reef varies along the length of the pool in the portion of the channel.

5. The wave pool in accordance with claim 1, further comprising a first trough adjacent the reef opposite the deep region, the first trough having a mean third depth that is deeper than the mean second depth of the reef.

6. The wave pool in accordance with claim 1, wherein the reef includes one or more reef modules attached to a bottom surface of the channel proximate the deep region.

7. The wave pool in accordance with claim 6, wherein at least some of the one or more reef modules include one or more wave damping mechanisms.

8. The wave pool in accordance with claim 5, further comprising a second trough in the deep region, the second trough having a mean fifth depth that is deeper than the mean first depth.

9. The wave pool in accordance with claim 8, wherein the mean fifth depth varies along the length of the wave pool.

10. The wave pool in accordance with claim 1, wherein a shape of the channel is selected from the set of shapes that consist of: a linear channel, a circular channel, a curvilinear channel, an oval channel, or a U-shaped channel.

11. A wave generator for generating a wave in a pool of water and having bi-directionality, the wave generator comprising:

a foil having a vertical front surface defined by a proximal edge, a distal edge, a bottom edge and a top edge, the vertical front surface being substantially symmetrical around a central vertical axis between the proximal edge and the distal edge to provide substantially equal respective first and second wave forming surfaces, each of the first and second wave forming surfaces having a horizontal cross-sectional geometry that is concave about a front vertical axis in front of the vertical front surface thereof between a point defined by the respective proximal or distal edge and a midsection of the foil, the foil having rotation in a yaw angle about the central vertical axis to at least a first position and a second position, each of the first and second positions forming a leading surface of one of the first and second wave forming surfaces, and forming a trailing surface of the other of the first and second wave forming surfaces, the rotation to the first or second position enabling the leading surface to exert drag against the water when the foil moves in a horizontal direction perpendicular to the central vertical axis to generate a primary wave in the pool, and enabling the trailing surface to decrease the drag of the leading surface to minimize oscillatory waves that trail the primary wave from the water that moves past the leading surface.

12. The wave generator in accordance with claim 11, further comprising a vertical back surface having a V-shape having a vertex that faces outward about the central vertical axis toward each of the proximal edge and the distal edge to form a leading back surface and a trailing back surface in the first position and the second position, respectively.

13. The wave generator in accordance with claim 12, wherein the leading back surface is vertically oriented to be substantially parallel to the horizontal direction in the first position or the second position.

14. The wave generator in accordance with claim 11, further comprising a bottom plate extending down from the bottom edge of at least one of the first and second wave forming surfaces.

15. The wave generator in accordance with claim 11, further comprising a top plate extending up from the top edge of at least one of the first and second wave forming surfaces.

16. The wave generator in accordance with claim 12, further comprising a top surface and a bottom surface, and wherein the vertical front surface, vertical back surface, the top surface and the bottom surface form a three-dimensional container.

17. The wave generator in accordance with claim 16, wherein the three-dimensional container includes one or more compartments.

18. The wave generator in accordance with claim 17, wherein the one or more compartments includes one or more water or air fillable sections for buoyancy control of the foil.

19. The wave generator in accordance with claim 18, wherein the one or more compartments includes one or more water-filled sections, and wherein each water-filled section includes one or more apertures for water flow therethrough.

20. The wave generator in accordance with claim 11, wherein the yaw angle is tunable to achieve one of a number of generated waves.

21. A wave pool having a length, the wave pool comprising:

a channel having a length, the channel for containing water at a mean surface level and having a first side and a second side, at least a portion of the channel having a cross-section, between the first side and the second side normal to the length, that comprises:

a deep region in the channel at least partially along the length of the wave pool and proximate the first side, the deep region having a mean first depth below the mean surface level of the water contained in the channel;

a reef at least partially along a length of the deep region, the reef extending upward and away from the deep region to a mean second depth that is shallower than the mean first depth of the deep region; and a beach region that slopes up away from the [reef] toward the second side to expose a beach above the mean surface level of the water, the beach region having a convex parabolic shape with a slope that decreases toward the second side of the channel;

a track along on the first side of the channel; and at least one foil that is movable along the track in each of two directions along the track, the at least one foil comprising a vertical front surface defined by a proximal edge, a distal edge, a bottom edge and a top edge, the vertical front surface being substantially symmetrical around a central vertical axis between the proximal edge and the distal edge to provide substantially equal respective first and second wave forming surfaces, each of the first and second wave forming surfaces having a horizontal cross-sectional geometry that is concave about a front vertical axis in front of the vertical front surface thereof between a point defined by the respective proximal or distal edge and a midsection of the foil, the foil having rotation in a yaw angle about the central vertical axis to at least a first position and a second position, each of the first and second positions forming a leading surface of one of the first and second wave forming surfaces, and forming a trailing surface of the other of the first and second wave forming surfaces, the rotation to the first or second position enabling the leading surface to exert drag against the water when the foil moves in a horizontal direction perpendicular to the central vertical axis to generate a primary wave in the pool, and enabling the trailing surface to decrease the drag of the leading surface to minimize oscillatory waves that trail the primary wave from the water that moves past the leading surface.

* * * * *